A. F. BERGIN.
TIRE GRIP.
APPLICATION FILED OCT. 24, 1910.

1,000,662.

Patented Aug. 15, 1911.

2 SHEETS—SHEET 1.

Witnesses

Inventor
A. F. Bergin
By
Attorneys

A. F. BERGIN.
TIRE GRIP.
APPLICATION FILED OCT. 24, 1910.
1,000,662.
Patented Aug. 15, 1911.
2 SHEETS—SHEET 2.
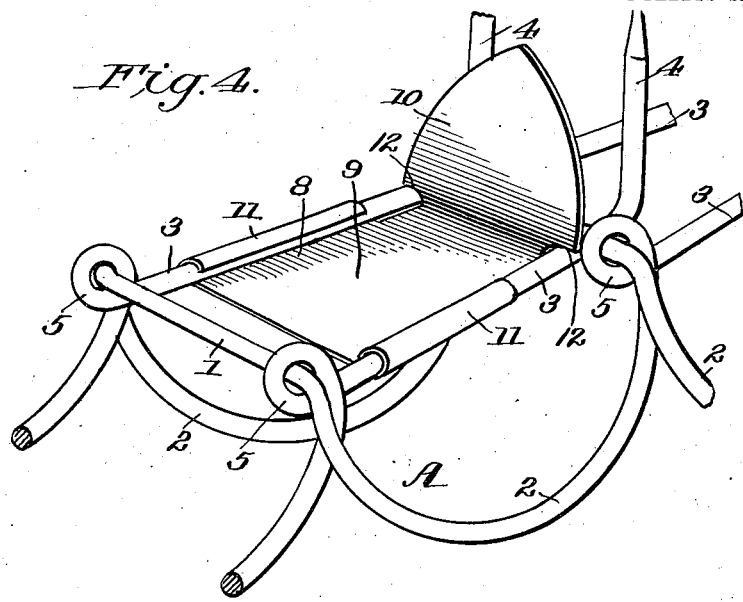
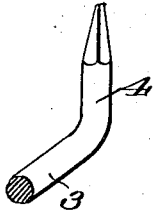
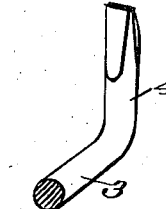
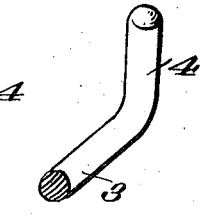
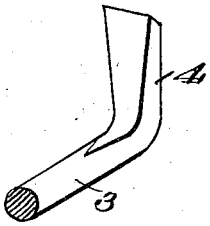
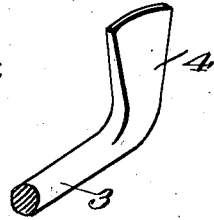
Witnesses
Inventor
A. F. Bergin
By
Attorneys

UNITED STATES PATENT OFFICE.

ANDREW F. BERGIN, OF HOWELL, MICHIGAN.

TIRE-GRIP.

1,000,662.
Specification of Letters Patent.
Patented Aug. 15, 1911.

Application filed October 24, 1910. Serial No. 588,815.

*To all whom it may concern:*

Be it known that I, ANDREW F. BERGIN, a citizen of the United States, residing at Howell, in the county of Livingston and State of Michigan, have invented certain new and useful Improvements in Tire-Grips, of which the following is a specification.

This invention comprehends certain new and useful improvements in surface gripping devices for use on the pneumatic or cushion tires of automobiles, motor trucks, motor cycles, or other vehicles, and the invention has for its primary object an improved tire grip which is simple, durable and light in construction, which may be readily applied to the tire of a wheel, and which is quite efficient in operation and firmly engages the road surface to prevent slipping and skidding. And the invention has for a further object an improved construction of anti-slipping device of this character embodying an improved construction and arrangement of snow lugs designed for use particularly where a road is frozen over and covered with snow.

With these and other objects in view as will more fully appear as the description proceeds, the invention consists in certain constructions, arrangements and combinations of the parts that I shall hereinafter fully describe and claim.

Figure 1:
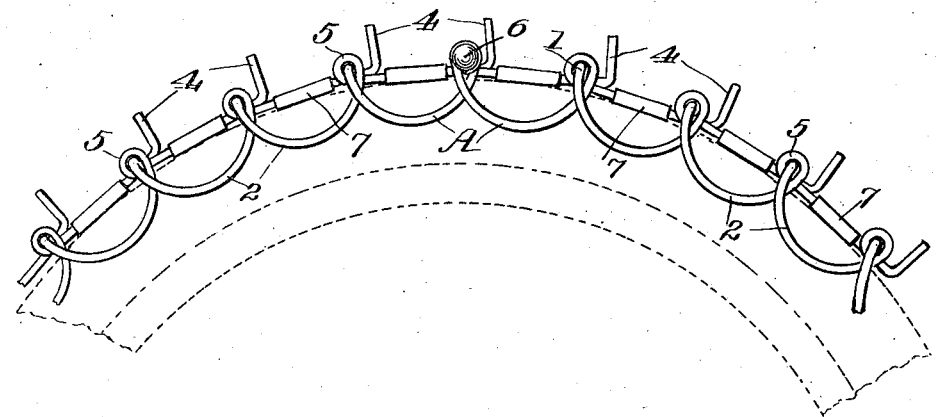
Figure 2:
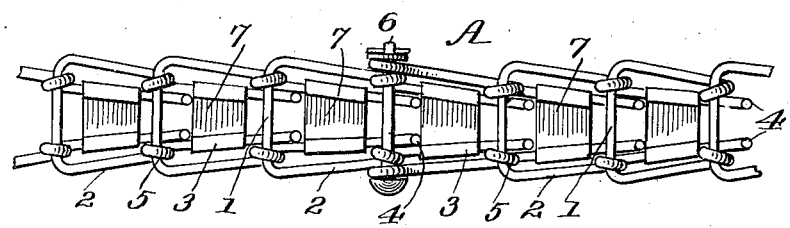
Figure 3:
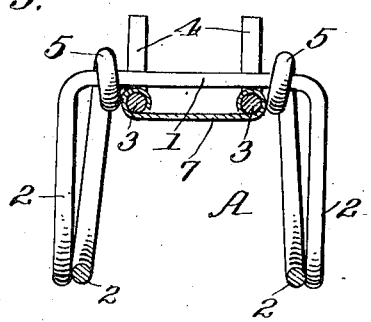

For a full understanding of the invention, reference is to be had to the following description and accompanying drawings, in which:

Figure 1 is a side elevation of a portion of a tire grip constructed in accordance with my invention; Fig. 2 is a top plan view thereof; Fig. 3 is a transverse sectional view; Fig. 4 is a perspective view illustrating a modification; and, Figs. 5 to 10 are detail perspective views of different forms of prongs.

Corresponding and like parts are referred to in the following description and indicated in all the views of the drawings by the same reference characters.

My improved tire grip is designed to encircle the tire of a vehicle wheel and to be held thereon by the inherent construction of the device without devices binding the grip to the tire or felly of the wheel, and said grip embodies any desired number of links A which have a jointed connection with each other and which initially or in an inoperative position, compose a linked structure of any desired length according to the circumference of the tire for which it is designed, the links being of any desired size and of any desired width, according to the particular requirements of the case.

In the practical embodiment of the invention, each of the links A embodies a cross bar 1 which may be either curved or straight, as shown, side bars 2 that are preferably inwardly bowed to any desired curvature and of any desired length, tangential extensions 3 projecting parallel to each other and preferably straight, and substantially outwardly projecting radial prongs 4 which may be blunt or sharpened at their outer extremities, as desired. The side bars 2 are preferably integrally joined to the cross bars 1 and are also preferably integrally joined, with one or more coils 5 to the extensions 3. In the assembled relation of the parts, the cross bar of one link A extends through the coils 5 of an adjacent link, whereby to pivotally connect the links together, and the prongs 4 of one link project outwardly around the cross bar 1 of the next link but one, so that the extension bars limit the pivotal movement of the links relative to each other, it being understood that in the preferred construction of the parts the links are of spring wire of the requisite thickness and strength to possess the characteristic of resiliency. In the applied position of the parts, the links extend circumferentially around the tire to which the device is applied and are held thereon by the engagement of the side members 2 with the opposite side faces of the tire, a complete circle being formed and the two ends of the linked structure being connected together by a pin or bolt 6 which may be provided with a cotter or otherwise held in place, said pin constituting the cross bar of one link, and extending through the coils 5 of an adjacent link.

From the foregoing description in connection with the accompanying drawing, it will be understood that in the practical use of a tire equipped with a grip structure in accordance with my invention, the prongs 4 will penetrate the road surface and obtain the desired grip thereon to effectually prevent any slipping of the wheels or skidding of the vehicle.

If desired, I may provide the links A with tread members, as indicated at 7 in Fig. 2, said tread plates being of relatively light metal and being secured to the tread engaging extensions 3 in any desired way, as by curling the side edges of the plates around said extension bars. Or, if desired, I may employ, instead of the tread plates 7, snow lugs, one of which is designated 8 in Fig. 4, said snow lugs embodying plates 9 that may be secured to the extension bars of the links in any desired way so as to rest on the tread surface of the tire, and also embodying outwardly turned transversely extending and preferably pointed spurs 10 to dig into the packed snow and thus secure the proper grip on the road surface. The snow lugs are provided with side flanges 11 engaging the extension bars 3. Each spur is formed in its side edges with inwardly facing shoulders 12 that bear against the adjacent extension bars 3 in order to brace the spur against inward displacement.

Reference is to be had to Figs. 5 to 10, to show some of the different forms of prong which may be used. In the first of these forms, the prong is illustrated as having a spur point; in the second, a square point; in the third, a claw point; in the fourth a stub point; in the fifth a chisel point; and in the sixth a rudder point, the latter being preferably used for the front or steering wheels of a vehicle.

It is to be understood that my invention is not limited to any number of links, or size thereof, nor to the use of tread plates or snow lugs, and that various changes may be made in the construction, arrangement and proportion of the parts without departing from the scope of the invention as defined in the appended claims.

Having thus described the invention, what is claimed as new is:

1. A tire grip including a series of connecting links, each link comprising a cross bar, side bars projecting from the cross bar and pivotally connected to the cross bar of the adjacent link, and extension bars projecting longitudinally from the side bars beyond said pivotal points and adapted to bear against the cross bar of the next link but one, to limit the movement of said pivotally connected links.

2. A tire grip including a series of connected links, each link comprising a cross bar, side bars projecting from the cross bar and pivotally connected to the cross bar of the adjacent link, extension bars projecting longitudinally from the side bars beyond said pivotal points and passing underneath the cross bar of the next link but one, and prongs projecting outwardly from the free ends of the extension bars.

3. A tire grip including a series of connected links, each link comprising a cross bar, side bars projecting from the cross bar and pivotally connected to the cross bar of the adjacent link, extension bars projecting longitudinally from the side bars beyond said pivotal points, and a plate secured to and extending between the extension bars and adapted to bear against the periphery of the tire within said adjacent link.

4. A tire grip including a series of connected links, each link comprising a cross bar, side bars projecting from the cross bar and pivotally connected to the cross bar of the next adjacent link, the portions of the side bars between the first-named cross bar and said pivotal points being correspondingly bowed inwardly to obtain a broad bearing against the opposite sides of the tire, extension bars projecting longitudinally from the side bars beyond said pivotal points, and a plate secured to and connecting the extension bars and adapted to bear against the periphery of the tire between the bowed side bars of the adjacent link.

5. A tire grip comprising a series of connected links, each link consisting of a straight cross bar and side bars projecting from the cross bar and pivotally connected to the cross bar of the next adjacent link, the portions of the side bars between the first-named cross bar and said pivotal points being correspondingly bowed inwardly to obtain a broad bearing against the opposite sides of the tire.

6. A tire grip including a link having spaced side bars, and a plate extending between and having its side edges secured to the side bars, one end portion of the plate being bent angularly outwardly to constitute an engaging spur, the spur being formed in its side edges with shoulders facing toward and bearing against the respective side bars.

7. A link for tire grips comprising a cross bar, side bars projecting from the cross bar and having their terminals angularly disposed to constitute road-engaging prongs, the side members being formed approximately midway between the prongs and the cross bar with transversely alining journal loops, and being bowed between said loops and the cross bar.

In testimony whereof, I affix my signature in presence of two witnesses.

ANDREW F. BERGIN. [L. S.]

Witnesses:
FRANCIS J. SHIELDS,
ALTA H. BEARDSLEY.